May 14, 1940. W. D. MOUNCE 2,200,476
MEASUREMENT OF ACOUSTICAL PROPERTIES OF MATERIALS
Filed Dec. 31, 1935 4 Sheets-Sheet 2

Whitman D. Mounce Inventor
By P. H. Young Attorney

Patented May 14, 1940

2,200,476

UNITED STATES PATENT OFFICE 2,200,476

MEASUREMENT OF ACOUSTICAL PROPERTIES OF MATERIALS

Whitman D. Mounce, Houston, Tex., assignor to Standard Oil Development Company, a corporation of Delaware Application December 31, 1935, Serial No. 56,963

14 Claims. (Cl. 181—0.5)

This invention relates to the measurement of acoustical properties of media; more particularly it relates to the measurement of acoustical impedance, attenuation, and of velocities of propagation of elastic waves in the media.

It is an object of this invention to utilize for geophysical exploration the acoustical properties of the earth which, in the sense here employed, are dependent on the density, elasticity, and viscosity of the materials comprising the earth.

More specifically the method can be used for measuring the velocity, acoustic attenuation, and acoustic impedance of elastic waves in the earth's strata penetrated by drill holes; from the results of such measurements in drill holes, it is possible to deduce geologic sections through the drill holes. Also, the methods can be used for determining the acoustical impedance and attenuation of, or the velocity in the ground by mounting the apparatus on a truck and driving the truck along the surface of the ground; in this way information is derived concerning the variation of acoustic properties in different geologic strata at the surface of the earth. Other applications of the method will suggest themselves to those familiar with the art.

Figure 1:
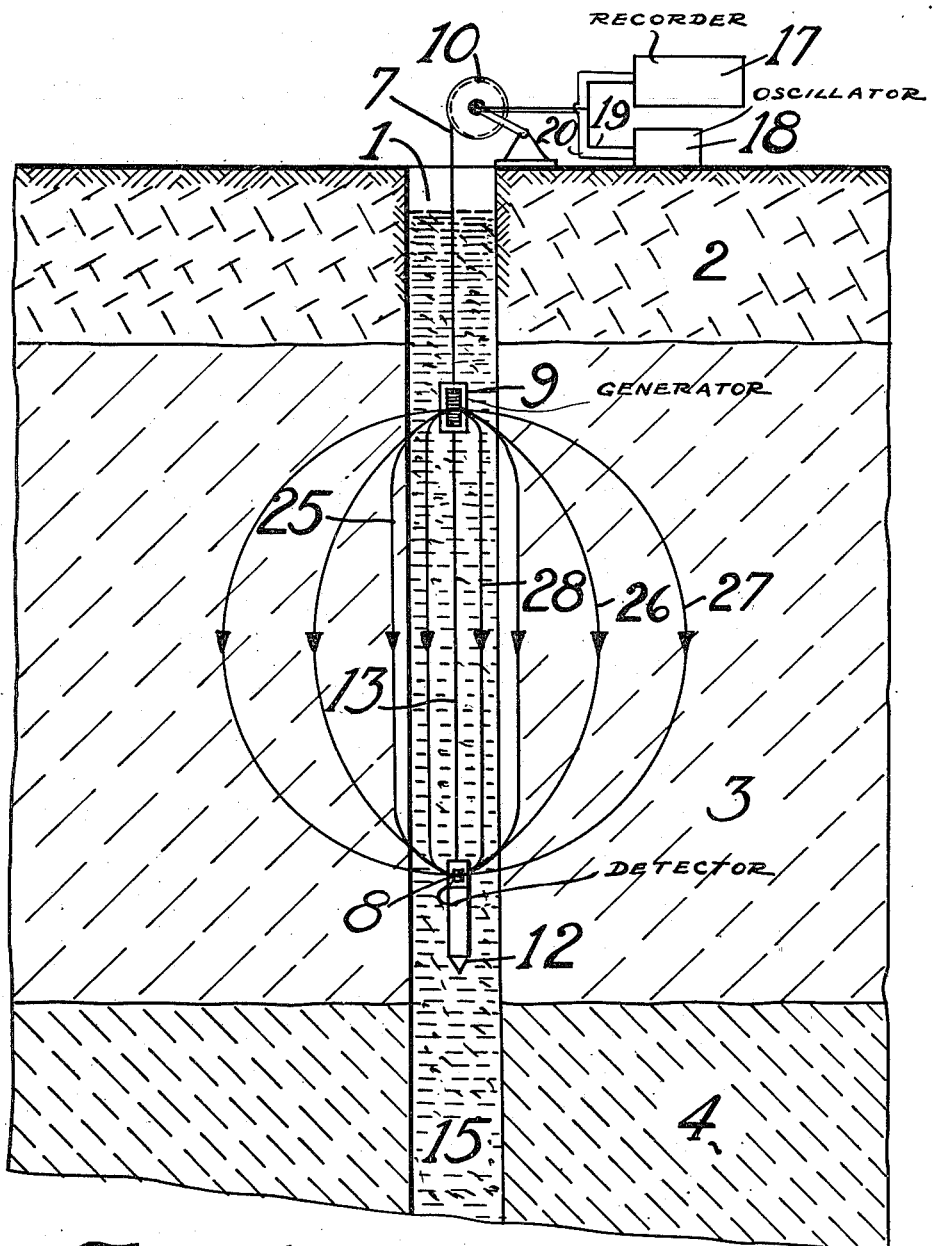
Fig. 1 is a vertical sectional view through the earth showing the application of the apparatus to a bore hole.
Figure 2:
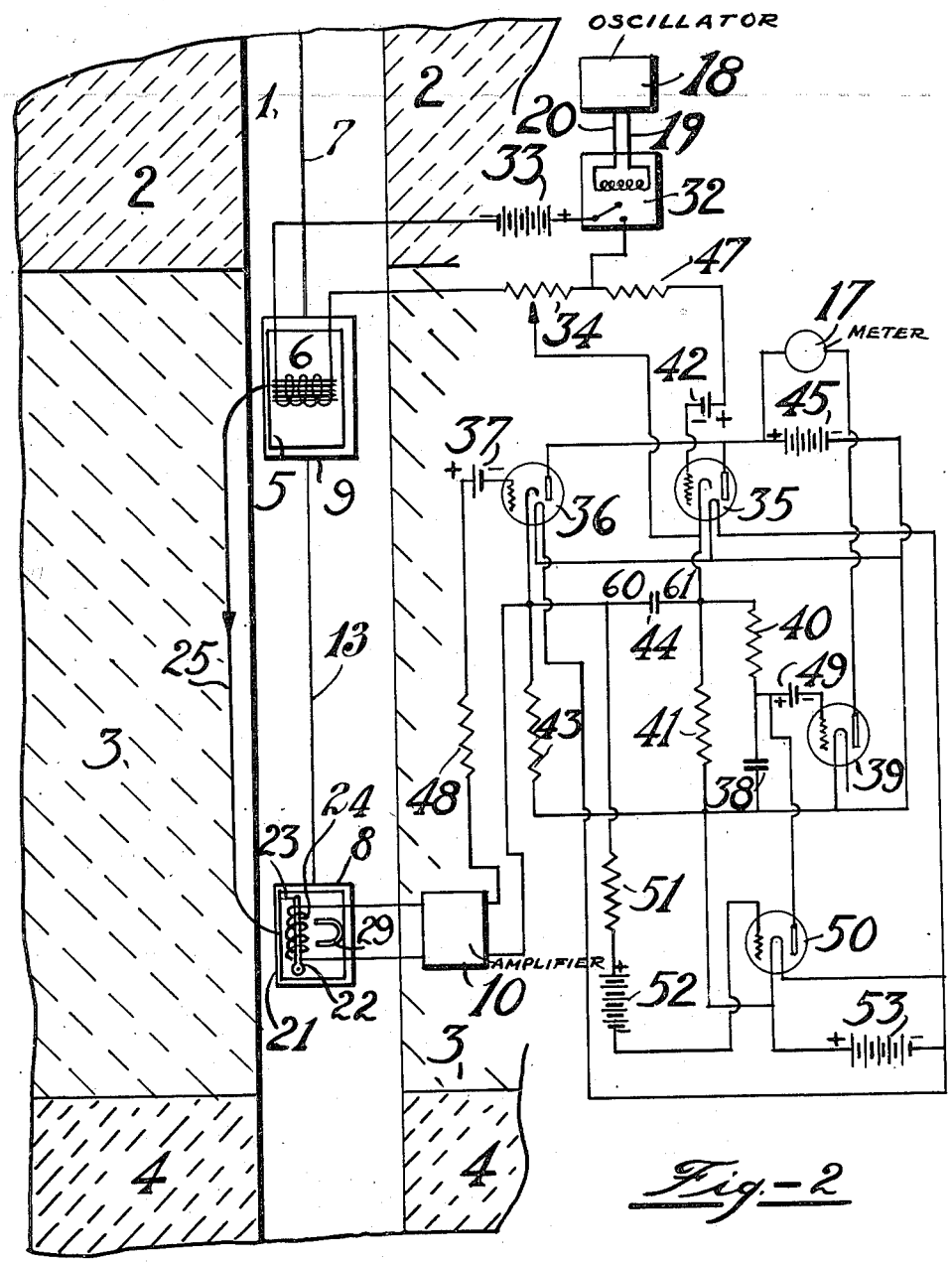
Fig. 2 is a vertical sectional view through the earth showing diagrammatically a preferred form of apparatus for measuring the velocity of elastic waves in the earth.

Referring particularly to Figs. 1 and 2 of the drawings, reference numeral 1 designates a bore hole in the earth which penetrates earth strata 2, 3, 4 and the like. A cable 7 is suspended in the hole and carries a generator of elastic waves 9. A receiver 8 is suspended by a cable 13 from the generator 9. In the embodiment illustrated, the container of receiver 8 carries also auxiliary electrical apparatus 12. Elastic waves generated in the generator 9 pass through the surrounding medium in the well which usually will be a drilling mud 15. Alternatively the medium may be water, air or the like and some of the advantages of the invention will be retained. The elastic waves pass from the generator 9 through the drilling mud 15 and through the adjoining earth stratum 3 as illustrated by lines 25, 26, 27 and 28 in Fig. 1. In passing through the stratum 3, the acoustical properties of the stratum alter the energy received at receiving station 8. The elastic energy received at 8 is converted to electrical energy by the auxiliary electrical apparatus 12, and is transmitted to the surface of the earth through the cables 13 and 7 to a recording device 17. Variation in the vertical elevation of the generator and receiving apparatus are affected by means of a reel 16 or the like, over which the cable 7 passes. The recording apparatus may be a recording galvanometer 17. A suitable oscillator 18 for actuating the electrical apparatus may be disposed at the surface of the earth as illustrated. Preferably the elastic wave generator 9 and the receiver 8 are spaced from each other longitudinally in the hole a uniform predetermined distance. The cable 13 contains electrical conductors, and is insulated from generator 9 and receiver 8 by means of a material such as rubber composition, hemp rope or the like of a lower velocity and a higher attenuation to acoustic energy than the surrounding medium of the earth.

Referring particularly to Fig. 2 a preferred form of apparatus is illustrated for measuring the velocity of elastic waves through the strata. In the figure, numeral 3 designates the medium which is to be measured, while numeral 2 designates a geologic stratum lying above medium 3, both media being penetrated by the bore hole 1. As shown here, the apparatus comprising the generator 9, the detector or receiver 8, and the auxiliary apparatus 12 is lowered down the bore hole 1. This generator consists of a stiff diaphragm 5 which is displaced by an electromagnet 6, and actuated periodically and momentarily by an electrically operated switch 32, which is controlled by oscillator 18 at the surface of the earth through conductors 19 and 20. These conductors are contained in the cable 7 of Fig. 1. Numeral 33 designates a battery for driving the diaphragm. The auxiliary apparatus 12 is as follows. In series with the driving magnet 6 is a potentiometer 34, the voltage drop of which applies a positive grid potential to the gas triode 35 when a current pulse flows through the magnet 6. The control grid of vacuum tube 36 is connected to the receiver or detector 8 through the amplifier 10, and is negatively biased by the battery 37 so that its plate current does not flow until a positive voltage pulse is applied to its grid by the detector 8 through the amplifier 10. The detector 8 comprises a diaphragm 21 which is displaced by the elastic energy; the diaphragm being connected to a pivotally mounted core 22 through a link 23 effects displacement of the core. The core and an inductance coil 24 are in the field of a magnet 29 so that a positive voltage pulse is created proportional to the elastic energy received by the diaphragm. When current is flowing through gas triode 35 and resistance 41, condenser 44 is charged to the potential of battery 45 minus the potential drop in gas triode 35, point 61 being charged positively and point 60 negatively. Now when detector 8 causes a positive pulse to be applied to the grid of gas triode 36, plate current begins to flow in this tube, causing a positive potential from condenser 44 to be applied momentarily to the cathode of gas triode 35, which stops its plate current. At this time no current is flowing in potentiometer 34, consequently gas triode 35 remains nonconducting until another positive pulse is applied to its grid. When gas triode 36 is conducting, current flows through resistance 43, and condenser 44 is charged with point 60 positive and point 61 negative. At this point a positive pulse applied to the grid of gas triode 35 reverses the above behavior. In other words, the two gas triodes 35 and 36 are so connected that when plate current is flowing in one of them, this current may be stopped by applying a positive voltage pulse to the grid of the other; or, at any time, plate current flows in one and only one of the gas triodes 35 and 36.

At the beginning of operation, plate current is flowing in gas triode 36. Now when switch 32 is closed momentarily (it obviously must be open at the time the impulse reaches the receiver), diaphram 5 is displaced by electromagnet 6, and plate current flows in gas triode 35 and through resistance 41, which extinguishes gas triode 36 at the same time the sound impulse from the diaphragm is sent out. When plate current flows in gas triode 35, and resistance 41, condenser 38 begins to charge through resistance 40. When the first energy of the elastic impulse from the diaphragm reaches the detector 8, such as through a path 25, the electric energy generated is amplified by 10 and applies a positive pulse to the grid of gas triode 36 which causes plate current to start flowing in gas triode 36 and resistance 43, extinguishing 35, thereby removing the charging voltage of condenser 38. The voltage of condenser 38 is measured with the vacuum tube voltmeter tube 39 and ammeter 17. Gas triode 35, resistance 40, and condenser 38 are so chosen that for the time that plate current flows in gas triode 35, the voltage across condenser 38 is only a small part of the voltage across resistance 41; hence the reading of meter 17 is determined by the time required by the sound impulse from generator 9 to travel to the detector 8. Since the distance between 9 and 8 is fixed, the meter 17 may be calibrated in units of velocity of the medium between 9 and 8. Battery 53 supplies filament current for tubes 35, 36, 39 and 50. Battery 42 furnishes the necessary grid bias for gas triode 35. B battery 45 supplies the plate voltages for the two gas triodes 35 and 36, respectively, and for the vacuum tube voltmeter 39. Current readings which are inversely proportional to the velocity are obtained from the meter 17. 47, 48 and 51 are large resistances, which prevent the grid currents in these three tubes from becoming excessive when their grids are positive. 50 is a tube with negative grid bias 52, whose plate resistance is very high when there is no current flowing in resistance 43, but whose plate resistance drops to a low value when its grid becomes positive, discharging condenser 38 in a shorter time than was required to charge it through resistance 40. This is desirable when, instead of a single pulse as described above, a periodic series of impulses is used. In this case the vacuum tube voltmeter 39 with ammeter 17 and proper grid bias 49 gives a reading of the mean voltage across condenser 18.

It is evident that the lower the velocity of sound in the medium 3, the longer the time required for the elastic pulses to travel from generator 9 to receiver 8 and, therefore, the longer the time during which the condenser 38 is being charged, hence the greater the current indicated by the ammeter 17. On the other hand, if the velocity of sound in medium 3 is high, the condenser 38 is permitted to charge for only a short time, so that the current indicated by the ammeter 17 is small. Small currents in ammeter 17 are an indication of high velocities, while large currents indicate low velocities, hence the ammeter 17 may be calibrated in units of velocity.

If the medium between generator 9 and receiver 8 is a complex one, comprising several possible paths by which the impulse travels from generator 9 to receiver 8, such as earth 3, drilling mud 15 and connecting cable 13, the interval of time between impulses from the generator must be greater than the time required for any appreciable amount of energy to travel from generator 9 to receiver 8 by any of the possible paths, in order that the time which condenser 38 is charging is the smallest time required for an appreciable amount of energy of an impulse to travel from generator 9 to receiver 8. Thus, the velocity indicated by ammeter 17 is that of the highest velocity, or shortest time of travel-path, between generator 9 and receiver 8.

When the device is used along the surface of the ground the impulses travel from diaphragm 5 to detector 8 through the air and also through the ground. In cases where the velocity of sound through the ground is less than through the air, the device will measure the velocity of sound in air. When used in a bore hole filled with water or drilling mud, the velocity of sound through the mud is about 5000 feet per second and the velocity through the surrounding medium is generally much higher, so that in this case the velocity of sound through the surrounding medium will be determined.

Figure 3:
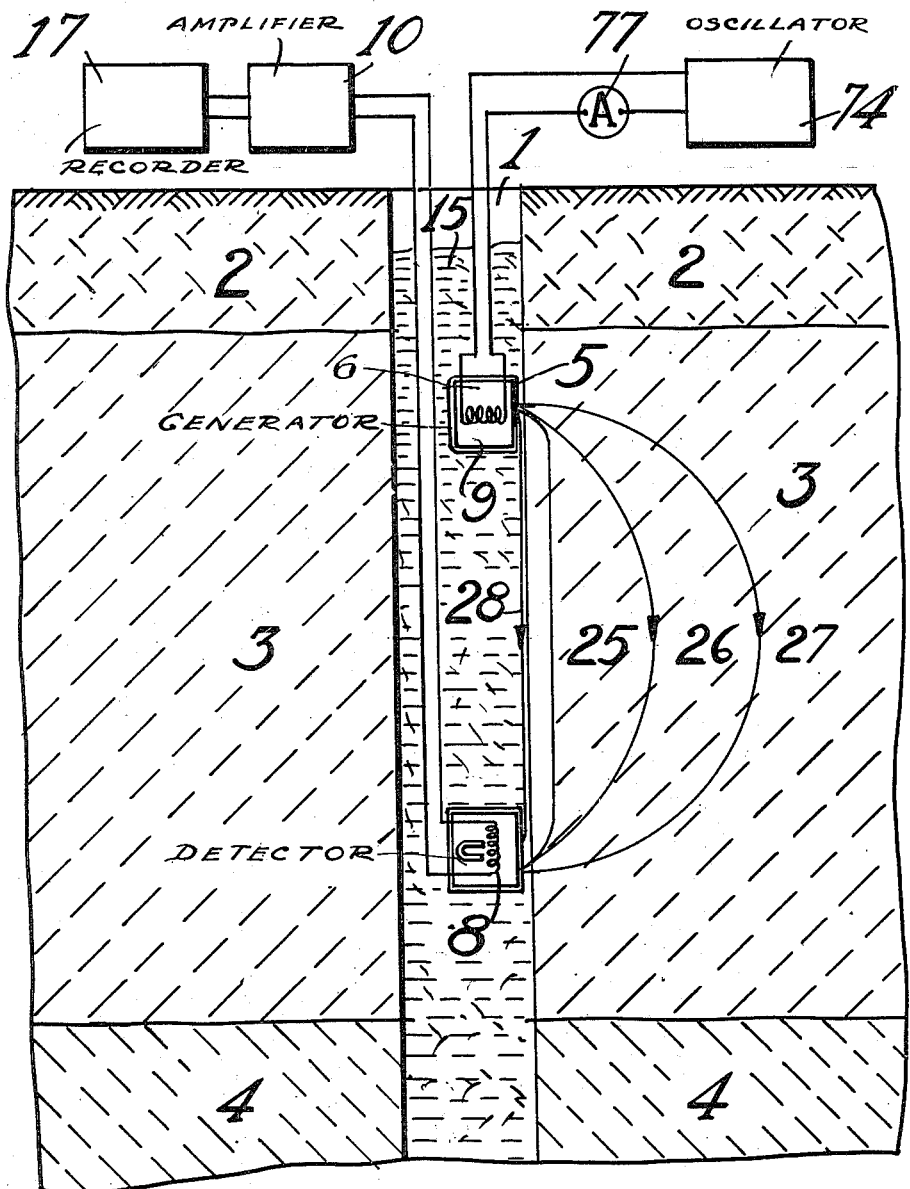
Fig. 3 is a vertical sectional view through the earth showing diagrammatically a preferred form of apparatus for measuring the acoustical attenuation of the earth in which the sending and receiving stations are spaced from each other.

Fig. 3 shows a preferred embodiment for the measurement of the acoustical attenuation between two points of a medium. In the figure, generator 9 is driven by oscillator 74, whose frequency is kept constant for any single measurement but may be changed for different measurements of the same stratum. Receiver 8 is located at a point in the drill hole removed from the generator, similarly to that illustrated in Fig. 1. The electrical energy supplied by the oscillator 74 is measured by ammeter 77. An amplifier 10 is connected between receiver 8 and the amplitude recorder 17. In this embodiment, energy from the generator 9 is transmitted through medium 3, the acoustical attenuation of which determines the amplitude measured by 17. If the oscillator 74 supplies energy at a constant rate, the recorded amplitude is determined by the acoustical attenuation of the medium between the detector 8 and generator 9. If the distance between generator 9 and the detector 8 is kept constant, the relative, or absolute, acoustic attenuation of various media may be read directly by recorder 17. When the device is used in a bore hole, filled with drilling fluid, the elastic energy from the generator 9 is conducted to the receiver 8 both through the drilling fluid and through the surrounding earth. However, since the fluid in the well is of the same composition throughout the depth of the well, comparative readings taken at different points in the well will indicate changes in the elastic properties of the earth strata at these points.

Figure 4:
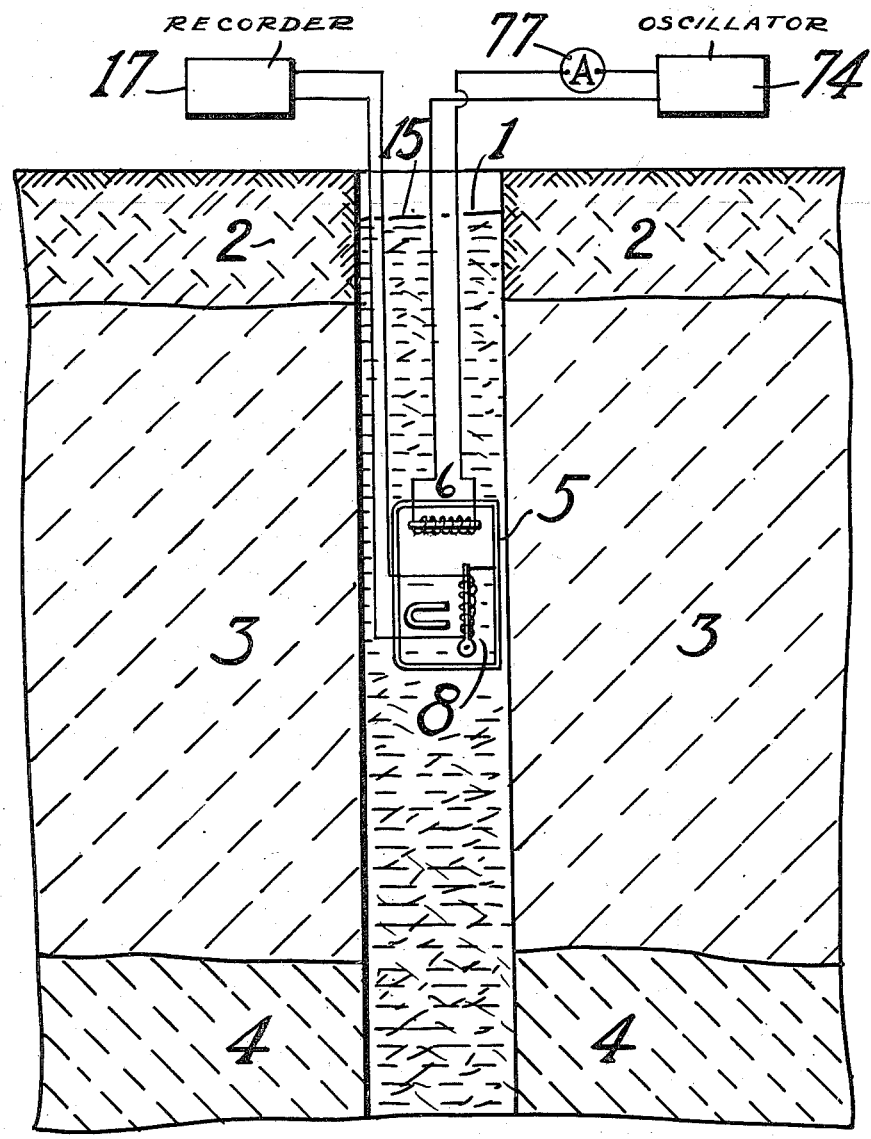
Fig. 4 is a vertical sectional view through the earth showing diagrammatically an alternative form of the apparatus for measuring the acoustical impedance of the earth using a single instrument.

In Fig. 4 is shown apparatus for measuring the apparent acoustic impedance of a medium from a single point. Numeral 3 designates the medium of which it is desired to measure the acoustical impedance. Numerals 2 and 4 designate other media abutting on medium 3. An oscillator 14 is used to drive a diaphragm 5 by means of an electro-magnet 6, the driving current being indicated by the ammeter 77 connected in the circuit. The mechanical energy from the diaphragm is transmitted either directly to the material to be measured, or through an inter-medium such as air, water or mud 15. Attached to the diaphragm is a device 8, which may consist of a coil caused to vibrate in the field of a magnet by the diaphragm, the device being connected to the amplitude recorder 17. The acoustical impedance of the medium surrounding the diaphragm determines the ratio of the amplitude of diaphragm 5 as read by meter 17 to the amount of electrical energy furnished by the oscillator 14 through meter 77. If the oscillator be made to supply energy at a constant rate, the amplitude measuring device 17 may be calibrated in units of acoustical impedance; this having been done, the apparent acoustical impedance of any medium adjacent to the diaphragm may be read directly.

Various changes and alternate arrangements may be made within the scope of the appended claims, in which it is my intention to claim all novelty inherent in the art as broadly as the prior art permits.

I claim:

1. Apparatus for measuring the acoustical attenuation of elastic waves through a given medium, which comprises means for generating elastic waves in the medium, means for measuring the energy supplied to actuate the generator in the medium, means for receiving waves from the medium at a point removed from the generator, and means for measuring the energy and amplitude of the received waves.

2. Apparatus for measuring the acoustical impedance of a medium at a point, which comprises an elastic wave generator for supplying elastic wave energy to the medium, means for driving the generator, means for measuring the energy supplied to drive the generator, and means for measuring the amplitude of the elastic energy supplied to the medium.

3. Apparatus for measuring the acoustical impedance of a medium at a point, which comprises an elastic wave generator for supplying elastic wave energy to the medium, an oscillator operatively connected to the generator, means for measuring the electrical energy supplied by the oscillator to the generator, and means for measuring the amplitude of the elastic energy supplied to the medium.

4. Apparatus for measuring the acoustical impedance of a medium surrounding a point, which comprises an elastic wave generator, including a diaphragm coupled to the medium for supplying elastic wave energy to the medium, an oscillator operatively connected to the generator to actuate the diaphragm, means for measuring the electrical energy supplied by the oscillator to the generator, and means for measuring the amplitude of vibration of the diaphragm.

5. The method for measuring the acoustical impedance of a medium surrounding a point, which comprises generating elastic energy in the medium, and measuring the load on the generator due to this medium.

6. The method of measuring the acoustical properties of a medium, which comprises actuating a vibratory member coupled to the medium, and observing the driving force of the member and the effect of the acoustical impedance of the medium on the displacement of this member.

7. The method of measuring the acoustical properties of a medium which comprises actuating a vibratory member coupled to the medium with a succession of continuous waves of given frequencies and successively measuring the energy actuating the vibratory member, and the effect of the medium on the amplitude of the vibratory member.

8. The method of logging a well, which comprises generating elastic waves of given frequency at a source in the well whereby the waves traverse the ground adjoining the well, measuring the energy supplied to actuate the generator, receiving these waves at a receiver disposed in the well, measuring the energy and amplitude of the received waves, and varying the vertical positions of the source and receiver in the well whereby variations in the acoustical attenuation of the elastic waves due to variations in the ground are determined.

9. The method of logging a well, which comprises generating elastic waves in the well whereby the waves traverse the ground adjoining the well, varying the vertical position of the generator in the well, measuring the energy supplied to drive the generator, and measuring the amplitude of the elastic waves in the ground adjoining the well whereby variations in the acoustical properties of the ground are measured.

10. The method of logging a well, which comprises supplying electrical energy to a generator of elastic waves in the well whereby the amplitude of the generator is affected by the acoustical impedance of the ground adjoining the generator, measuring the electrical energy supplied to the generator, measuring the amplitude of the generator, and varying the vertical position of the generator in the well whereby the acoustical impedance of the ground at the vertical positions is determined.

11. The method of logging a well, which comprises generating elastic energy at a source in the well whereby the energy traverses the ground adjoining the well, varying the vertical position of the source in the well, and measuring the effect of the ground on the transmitted elastic energy adjoining the different vertical positions of the source whereby acoustical properties of the ground adjoining the source are measured.

12. The method of logging a well, which comprises generating elastic energy at a source in the well whereby the energy is transmitted to the ground adjoining the well, varying the vertical position of the source in the well, and measuring variations in the load on the generator due to variations in the ground adjoining the source whereby variations in the acoustical impedance of the ground are measured.

13. The method of logging a well, which comprises actuating a vibratory member at a source in the well whereby the vibrations are transmitted to the ground adjoining the well, varying the vertical position of the source in the well, and observing the variations in the driving force of the member and the effect of the acoustical impedance of the ground on the displacement of the member at the various vertical positions of the source.

14. The method of logging a well, which comprises actuating a vibratory member at a source in the well whereby vibrations are transmitted to the ground adjoining the well with a succession of waves of given frequencies, varying the vertical position of the source in the well, successively measuring variations in the energy required for actuating the vibratory member, and successively measuring the effect of the ground on the amplitude of the vibratory member.

WHITMAN D. MOUNCE.